Aug. 14, 1928.

L. R. WILDER 1,680,832

CERAMIC PRODUCT AND PROCESS OF PRODUCING THE SAME

Filed Oct. 4, 1926

Witness:
A. Burkhardt.

Inventor:
Laurence R. Wilder,
By
attys.

Patented Aug. 14, 1928.

1,680,832

UNITED STATES PATENT OFFICE.

LAURENCE R. WILDER, OF NEW YORK, N. Y.

CERAMIC PRODUCT AND PROCESS OF PRODUCING THE SAME.

Application filed October 4, 1926. Serial No. 139,304.

My invention relates to ceramic products and it has among its objects the provision of a new, improved process of manufacturing porcelain and an improved porcelain product which is superior in mechanical, as well as in electrical, characteristics to the porcelain as made heretofore.

According to my invention an improved porcelain, of condiserably greater uniformity than the prior art products, is obtained by shaping the porcelain pieces through centrifugal action on a relatively fluid mixture of the porcelain ingredients, at the same time removing the moisture and fluid contents from the resulting raw porcelain piece.

Figure 1:
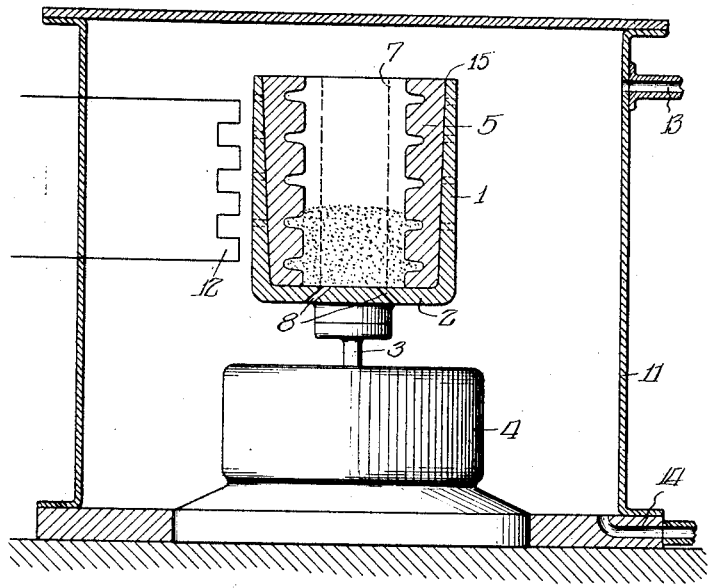
Figure 2:
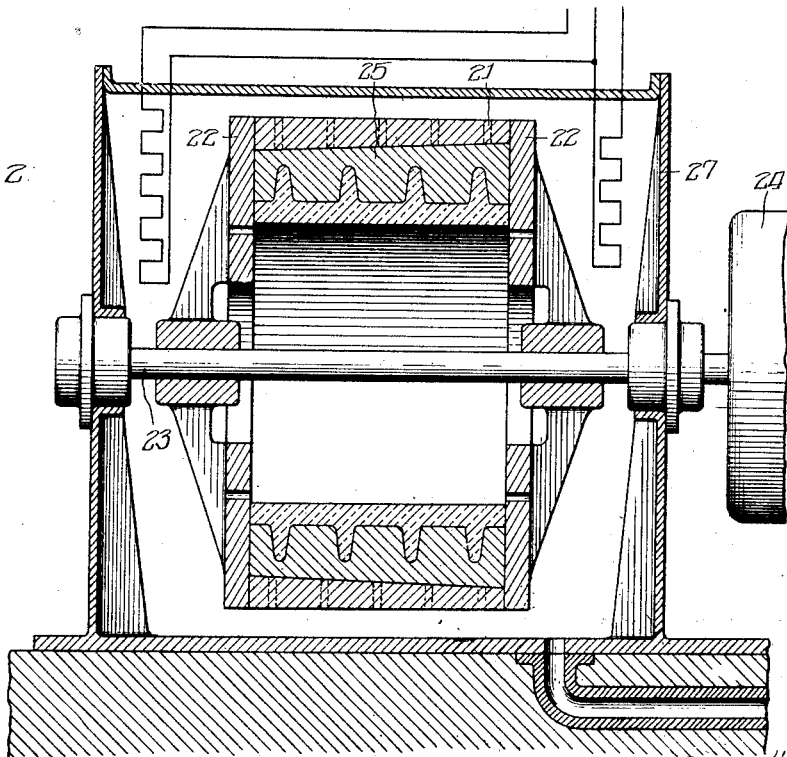

In the accompanying drawings, Figs. 1 and 2 are sectional views of two forms of apparatus for carrying out the improved process of forming the porcelain.

In manufacturing porcelain, particularly for use as electrical insulators subjected to high electrical, as well as mechanical, stresses, great difficulties are encountered in securing a product of sufficient uniformity to satisfy the exacting requirements met in service. Porcelain insulators which are very similar in exterior appearance will very often be found to differ radically in their characteristic properties, and as a result unusually large quantities of the final product must be rejected as failing to conform to the requirements, with consequently large increase in the cost of manufacture.

However, the segregation of a good insulator unit from a bad one is in itself a very difficult problem, and very often insulators which have passed the inspection in the manufacturing plant are found to fail under the actual conditions of operation, resulting in disastrous disturbances of the electrical systems in which they are used, and still larger losses from the accompanying interruptions of the service.

In an effort to overcome the foregoing difficulties, I have analyzed the causes of insulator failure and non-uniformity, and I have found that the lack of proper control of the distribution of the material in the insulators, as made in accordance with the manufacturing processes practiced heretofore, is principally responsible therefor.

In the prior art manufacture of porcelain, the material used to form the final product contains a considerable percentage of moisture which must be removed before the final product is fired. This excess of moisture heretofore has been removed by gradual drying, resulting in large shrinkage of the raw, unfired product, this shrinkage being in many cases as high as 20%.

I have found that this gradual removal of the moisture from the raw porcelain pieces and the minute movements of the masses of the raw material in the semi-finished product incident to the shrinkage are principally responsible for the lack of homogeneity in the porcelain product.

According to my invention the step of removing the moisture from the raw material used to shape the porcelain product is brought under control, and a definite distribution of the material is secured, by centrifugally segregating the moisture from the other constituents of the raw material in the course of the process of bringing it into the desired shape.

This centrifugal separation of the moisture from the substantive ingredients of the mass of the raw material, in the course of bringing it into the final shape, may, for instance, be carried on as follows:

A ceramic mixture comprising the necessary, previously prepared raw ingredients, with sufficient moisture content to give it a consistency of heavy oil or molasses, for instance, that is, while it will still flow, is poured into a sectional cylinder or mold. The inside of the mold is shaped to conform to the outside surface of the finished porcelain product. The mold and the fluid porcelain mass in the interior thereof are rotated at high speed, causing the solid ingredients of the ceramic mixture to be moved to the outside and to be massed next to the walls of the cylinder or mold. The moisture or water content of the raw mass, being of less specific weight than the substantive ingredients of the ceramic mixtures, will accumulate more towards the center of the rotating cylinder and is drained, or otherwise suitably removed.

A substantially dry product, in which the solid ingredients have been massed with great uniformity into a piece having the final shape, is thus centrifugally formed, and, depending on the length of time during which the mold is rotated, an extremely dense porcelain mass free from moisture and other less substantive ingredients is obtained. The resulting product is more homogeneous than that secured by any of the prior art processes. At the same time, the manufacture of the porcelain product is greatly simplified as compared to the prior art processes, eliminating long delays between the various production steps. In this way, the moisture is segregated from the substantive ingredients of the wet or moist ceramic material while it is being brought into final form.

My invention is not restricted to any specific arrangement for carrying out the foregoing combined process of forming the semi-final porcelain product and removing the moisture from the raw material used to form the product. In the attached drawings I have shown, by way of example, two such arrangements.

In Fig. 1 is disclosed a cylindrical mold holder 1, of steel, for instance, having sufficiently strong walls to withstand the mechanical stresses incident to rotation at very high speed, and said holder has a bottom 2 which is coupled to a shaft 3 of a vertically mounted driving motor 4. A cylindrically shaped mold 5 is placed in the mold holder 1, the interior of the mold being grooved to conform to the exterior surface of an insulator, for instance, which it is desired to make.

The substantive ingredients of the porcelain mixture, usually comprising suitably prepared feldspar, china clay and quartz, in desired proportions, are mixed with a sufficient quantity of water, or other suitable fluid, to give it a degree of fluidity that will permit it to be poured into the mold and to conform to the interior shape thereof when put into rotation. The mold with the fluid mixture in the interior thereof is then rotated at high speed by the motor 4, causing the separation of the ingredients of the porcelain mixture, as explained hereinabove. Under the action of the centrifugal forces, the substantive ingredients of the mixture will form a cylindrical body 7, the outer shape of which has the form of the porcelain ware that is intended to be made. The more or less liquid mass which accumulates towards the center of the cylinder is drained off through openings 8 at the bottom of the cylinder, or is otherwise suitably removed.

If further reduction of the moisture contents in the semi-final porcelain product is desired, it may be subjected to heat treatment, or vacuum treatment, or a combination of both, either while being formed by centrifugal action, or subsequently thereto. To this end a suitable casing 11 may be arranged to hermetically enclose the centrifugal molding apparatus, an electrical heating element 12 serving to maintain the required temperature in the interior of the casing, while a conduit 13 leading to a vacuum pump, (not shown), serves to produce the required vacuum. The bottom of the casing is also provided with a suitable valved drain 14 for removing any water, or other liquid, that may flow down from the mold during the initial part of the process of separating the moisture from the substantive ingredients of the porcelain.

By heating the molding chamber under simultaneous evacuation of the space thereof, while at the same time rotating the molded ware at very high speed, the semi-final product so obtained will be substantially fully freed from the moisture contents and is then ready to be fired upon removal from the mold.

In order to facilitate the removal of the ware from the mold 5, the outer surface 15 thereof and the cooperating surface of the cylindrical mold holder 1 are made slightly conical to permit the mold 5 with the molded ware 7 to be lifted from the holder. If the mold 5 is sectional, the ware may be readily separated therefrom, or the mold may be made of a readily breakable material, such as plaster, the mold shell 5 being then broken away from the molded ware 7.

A circular product is thus obtained in which the particles are radially graded in accordance with the specific weights thereof, giving a relatively denser outer layer or shell, with an interior slightly decreasing in density. The high density of the portions forming the outer portion of the molded piece is of great advantage in the usual outdoor insulators in which the combined effects of the weather, and the electrical and mechanical stresses are particularly concentrated on the exterior thereof.

In Fig. 2 is shown a modified arrangement for producing the centrifugally molded porcelain ware in accordance with my invention. A cylindrical mold holder 21 is horizontally supported by two end plates 22 held on a horizontal shaft 23 which may be rotated at high speed by means of a motor 24. Inside of the mold holder 21 is placed a substantially cylindrical mold 25 having a suitably shaped interior surface conforming to the outside of the ware which is to be molded. A porcelain mixture of proper fluidity is then poured into the mold and the porcelain ware is produced therefrom by rotating the cylinder with the mold at sufficient high speed to cause the relatively heavier substantive ingredients of the mixture to move outwardly and mass around the interior surface of the mold while leaving the relatively less heavy liquid mixture more towards the center of the rotary body, from where it may be suitably drained or removed. As in the arrangement of Fig. 1, the molding cylinder may be enclosed in a hermetic chamber 27 which may be suitably heated and evacuated as explained hereinabove.

My invention may be carried out in a variety of other ways and I do not desire to be limited by the specific descriptions of the molding arrangements and processes given hereinabove, except as indicated in the appended claims.

I claim:

1. The method of manufacturing a porcelain member having a predetermined outer shape, which comprises the steps of pouring a moldable, relatively fluid mixture containing the substantive ingredients of the porcelain into a mold having an interior surface substantially corresponding to the final shape of the porcelain member, and subjecting the fluid mass to centrifugal action by rotating said mold at sufficient speed to cause the substantive ingredients of the mixture to mass adjacent the surface of the mold under substantial segregation from the fluid contents of the molding mixture, removing said fluid contents, and firing the semi-final porcelain product so molded.

2. The process of manufacturing porcelain which comprises the step of molding the ware by subjecting a relatively fluid mass containing the ingredients of the porcelain to centrifugal action and thereby causing the substantive ingredients of said mixture to assume the final form while separating the liquid contents therefrom, and simultaneously maintaining the space around said molded ware under vacuum.

3. The process of manufacturing porcelain which comprises the step of molding the ware by subjecting a relatively fluid mass containing the ingredients of the porcelain to centrifugal action and thereby causing the substantive ingredients of said mixture to assume the final form while separating the fluid contents therefrom, and simultaneously heating and evacuating the space around said molded ware.

4. A porcelain article in which the particles constituting the mass thereof are graded in accordance with specific weights thereof.

5. A porcelain body having an outer mass of substantially greater density than the mass near the interior thereof.

6. A porcelain body of circular shape having an outer mass of substantially greater density than the mass near the interior thereof.

In testimony whereof I have hereunto signed my name.

LAURENCE R. WILDER.